United States Patent [19]

Schutze

[11] Patent Number: 5,484,634
[45] Date of Patent: Jan. 16, 1996

[54] CONNECTION ELEMENT MADE FROM A COMPOSITE MATERIAL WITH CARBON FIBRES

[75] Inventor: Rainer Schutze, Braunschweig, Germany

[73] Assignee: Deutsche Forschungsanstalt fur Luft- und Raumfahrt e.V., Cologne, Germany

[21] Appl. No.: 121,187

[22] Filed: Sep. 14, 1993

[30] Foreign Application Priority Data

Sep. 17, 1992 [DE] Germany .................. 42 31 067.9

[51] Int. Cl.$^6$ .................................................. B29D 22/00
[52] U.S. Cl. .................... 428/36.1; 428/36.5; 52/653.2; 52/309.2; 52/309.4
[58] Field of Search ............................. 428/36.1, 36.5; 52/653.2, 309.2, 309.4, 721

[56] References Cited

U.S. PATENT DOCUMENTS

| | | | |
|---|---|---|---|
| 4,703,769 | 11/1987 | Harrison, Jr. | 135/67 |
| 4,758,458 | 7/1988 | Schutze | 428/113 |
| 5,036,641 | 8/1991 | Viry | 52/646 |
| 5,128,192 | 7/1992 | Narasaki | 428/118 |

FOREIGN PATENT DOCUMENTS

| | | |
|---|---|---|
| 2503288 | 10/1982 | France . |
| 2560551 | 9/1985 | France . |
| 3931478 | 4/1991 | Germany . |

*Primary Examiner*—Christopher W. Raimund
*Attorney, Agent, or Firm*—Salter & Michaelson

[57] ABSTRACT

A rod connection arrangement includes a connection element for connecting a cylindrical reinforcing rod to a cylindrical main rod, with the reinforcing rod extending at an angle to the axis of the main rods. Each rod respectively consists of a core of compression material surrounded by a fiber composite wall having fabric layers with fibers that cross at an angle. The connection element consists of an arcuate body having a central axis and an inner surface with a radius substantially equal to an outer radius of the main rod. The arcuate body preferably extends over an arc of less than 360 degrees. The connection element further consists of an integrally formed joint plate projecting radially outwardly from an outer surface of the arcuate body. The joint plate is preferably formed by two layers of a fabric material imbedded in a rein matrix wherein fibers of the fabric layers cross at an angle of substantially ±45 degrees. The fabric layers extend from the joint plate onto the arcuate body to form the outer surface thereof. The inner surface of the arcuate body is secured with an adhesive to the outer surface of the main rod. The reinforcing rod further includes a compression resistant reinforcement inserted into one end thereof and further has an axially symmetrical slit formed in the end thereof, the slit being received over the joint. The slit end of the reinforcing rod is secured to the joint plate with an adhesive.

13 Claims, 6 Drawing Sheets

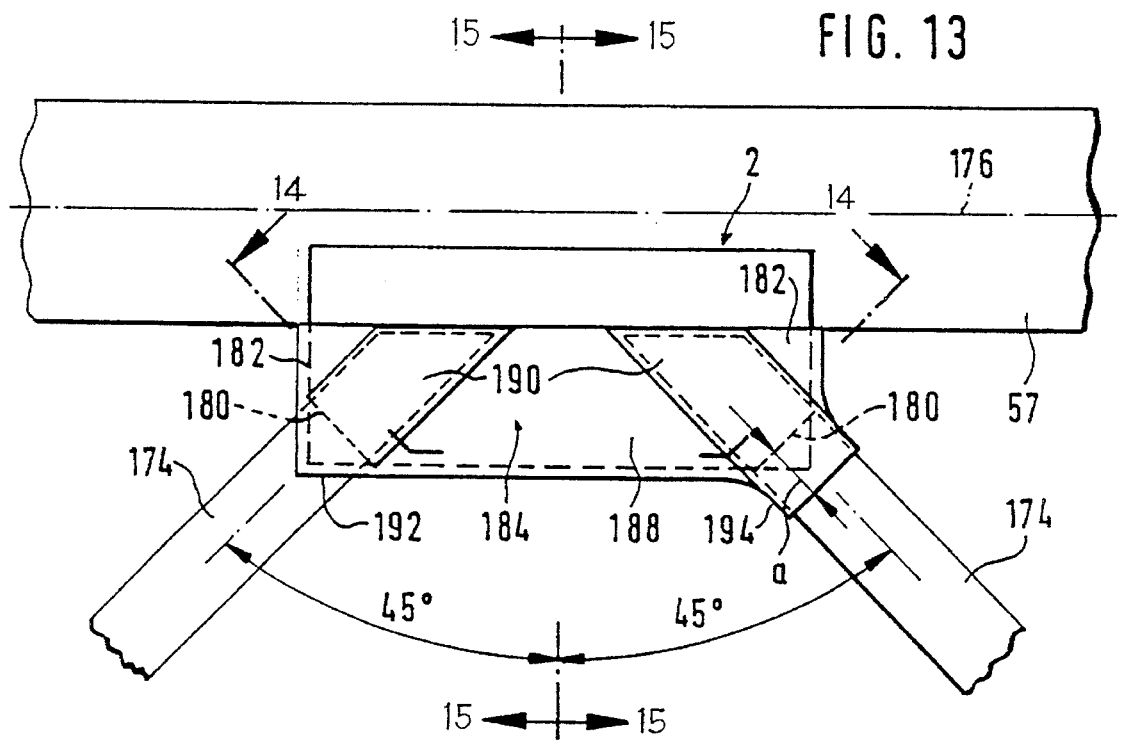
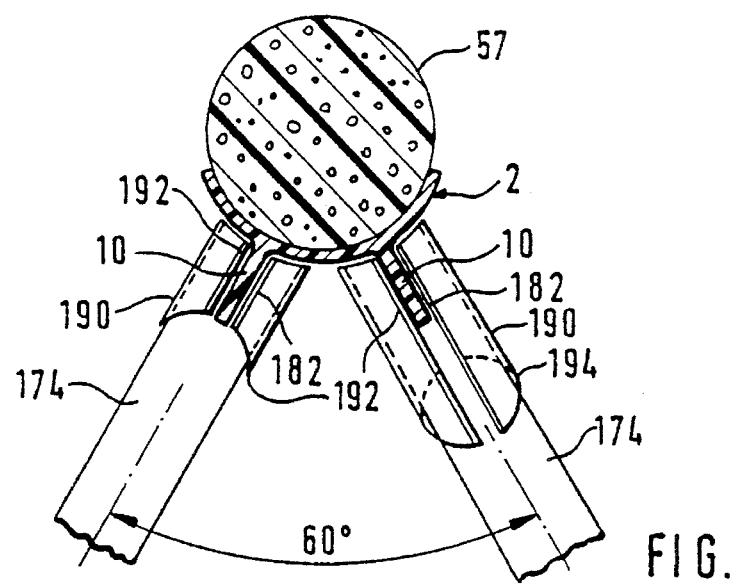

CONNECTION ELEMENT MADE FROM A COMPOSITE MATERIAL WITH CARBON FIBRES

BACKGROUND AND SUMMARY OF THE INVENTION

The invention relates to a connection element made from a composite material with crossing carbon fibres for a glued connection between rods lying at an angle to each other, in which the rods are connected together by the connection element.

In known connection elements of this type two opposite edges run at an angle which corresponds to the angle between the rods to be connected. These edges are curved according to the diameter of the rods. The rods are connected together such that the two curved portions of the connection engage in each case over one of the rods and are glued thereto. The web which is located between the two curved portions runs tangentially to the outer periphery of the two rods connected by the connection element (U.S. Pat. No. 4,758,458, DE-39 31 478 C1). Reference is also made to copending U.S. Ser. No. 08/021,317 filed on 23 Feb. 1993 by the same inventor now U.S. Pat. No. 5,357,729.

With frameworks difficulties may arise with these known connections if there are a plurality of rods at junction point, for example transverse and/or diagonal rods, to be connected to a continuous strut, particularly in the case of three-dimensional frameworks.

With frameworks made of metal it is known to weld the transverse and/or diagonal rods to the struts flush with the struts. It is also known to weld axially parallel junction plates to the struts to which the transverse and/or diagonal rods are connected. Both connection possibilities are dispensed with in designs made from fibre reinforced plastics, since the glued connections to be used here do not give the necessary solidity and/or rigidity.

The aim of the invention is a connection element with which in frameworks made from thin-walled rods made of composite materials with carbon fibres (CFK), the connection of transverse and/or diagonal rods to the rods forming the struts can be easily achieved.

The aim is achieved according to the invention by a connection element with the features of patent claim 1. A preferred refinement is the subject of patent claim 2.

A further aim of the invention is a device for manufacturing these connection elements and a method of manufacturing the connection elements with the aid of these devices, and also the embodiment of rods which are to be connected to rods forming the struts via the connection element.

These devices for manufacturing connection elements according to the invention, methods of manufacturing connection elements with these devices, and further the embodiment of the rods to be connected, are the subject of the dependent claims.

BRIEF DESCRIPTION OF THE DRAWINGS FIGURES

The invention is illustrated for example in the drawings and described in the following in detail together with the drawings. In detail:

FIG. 13 shows a side view of a strut rod with a connection element and attached diagonal rods, with a further embodiment of a connection of the diagonal rods with the joint plate;

FIG. 14 shows a section on the line K-L in FIG. 3; and

FIG. 15 shows a section on the lines M-N (left) and O-P (right).

DESCRIPTION OF THE PREFERRED EMBODIMENTS

Figure 1:
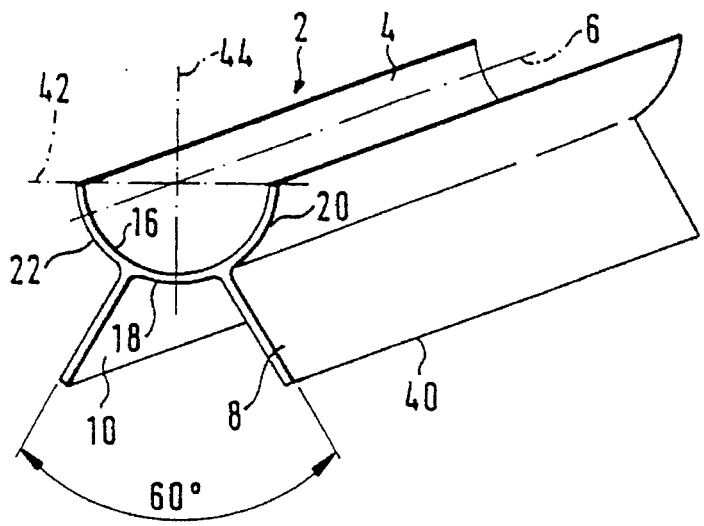
FIG. 1 shows an isometric view of a connection in a first embodiment.

The connection element 2 shown in FIG. 1 has a tube shell 4 with a semicircular cross section from the outside of which joint plates 8, 10, formed in one piece with the tube shell 4, project radially and extend in a plane extending through its axis 6 with respect to the tube shell. The two joint plates 8 and 10 lie at an angle of 60 degrees to each other. In three-dimensional frameworks with a cross section formed as an equilateral triangle transverse and/or diagonal rods can be connected to the framework struts with these connection elements. Thus these connection elements are glued with their tube shell 4 to the envisaged points on the struts of the framework. The diagonal and/or transverse rods are connected to the joint plates. They are provided with slots with which they are pushed on to the joint plates and are glued thereto.

Instead of with semicircular cross section having an arcuate extent of 180 degrees the tube shell may also be formed with a smaller or a larger arcuate extent. However in all cases it should have a arcuate extent of less than 360 degrees so that the connection can be glued to the strut rod without play.

The lines appearing in the cross section of the connection in FIG. 1 are in each case layers of fabric which are arranged in the embodiment shown in the drawing so that both the tube shell 4 and the joint plates 8 and 10 consist at each point of two layers of fabric. A fabric of carbon fibres is preferably used as the fabric. The fabric layer 16 forms the inner layer of the tube shell 4 and is so arranged that the fibres cross at an angle of between ±60 degrees to ±75 degrees, relative to the longitudinal axis 6 of the tube shell.

The fabric layer 18 forms the facing sides of the joint plates 8, 10 and the portion of the outer walls of the tube shell 4 which lie between the Joint plates. The two further fabric layers 20, 22 form in each case the opposite surfaces of the joint plates 8, 10 and the connected portions of the outer tube shell walls. In the fabric layers 18, 20, 22 the fibres should cross at an angle of between ±45 degrees relative to the longitudinal axis 6.

The fabric portions 16, 18, 20 and 22 are embedded in a resin matrix.

The inner fabric layer may also be dispensed with. The tube shell is then formed exclusively by the fabric layer which extends in each case into the joint plates. The fabric layers 18, 20, 22 may be all or partly multiple layers so that then the joint plates may consist of three (fabric layer 18 twice), four (fabric layers 18, 20, 22 twice), or more fabric layers.

Figure 2:
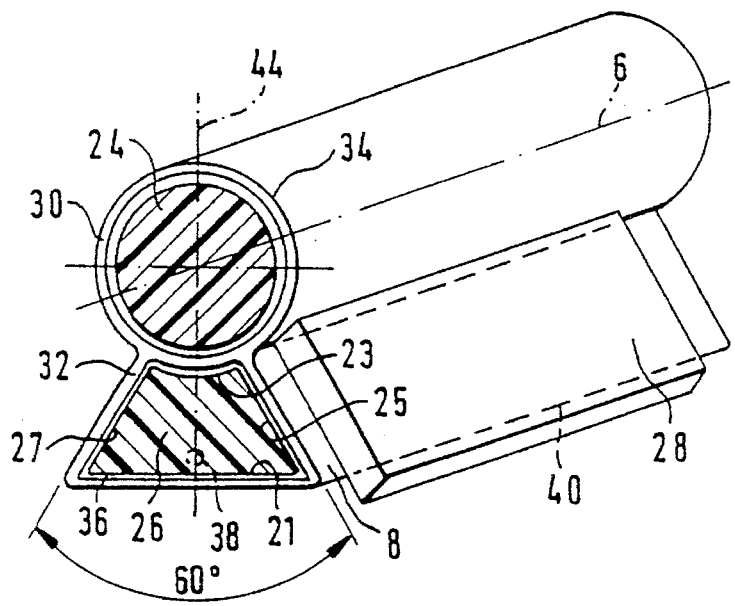
FIG. 2 shows a first embodiment of a device for manufacturing a connection according to FIG. 1.

FIG. 2 shows a device for manufacturing a connection element according to FIG. 1. This device has a cylindrical inner core 24 and an outer moulding element 26. The outer moulding element 26 corresponds with its outer contours to the contours of the connection element 2 between the two joint plates 8 and 10 with the two flat, mould surfaces 25 and 27 which lie at an angle of 60 degrees to each other, and a surface 23 which is concave in cross section with a curve radius corresponding to the curve radius of the tube shell between the two joint plates. The inner core 24 determines with its diameter the inner shape of the tube shell 4. Further the device has two pressure blocks 28 one of which is shown schematically in FIG. 2 with its outlines.

In order to manufacture a connection element, as shown in FIG. 1 with two fabric layers at each point, in each case a fabric hose 30, 32 made from carbon fibres is applied to the inner cores 24 and the mould element 26, so that the fibres cross in each case at the above mentioned angles. The fabric hoses on the inner core and the mould element are wetted with resin in those areas which form the tube shell 4 and the joint plates 8, 10, and the mould element 26 is then brought with its concave surface 23 into abutment on the cylindrical core. A further fabric hose 34 made from carbon fibres is applied over the cylindrical core and the mould element such that the fibres of this hose cross at an angle of ±45 degrees, relative to the axis 6. This further fabric hose 34 is also wetted with resin, which may be excess resin of the hose 30, 32 coating. The fabric hose 34 with the pressure block 28 is applied to the fabric hose 30 encircling the inner core and is applied to the first fabric layer 32 of the joint plates which is supported in the region of the joint plates.

The surfaces of the inner core 24 and of the mould core 26 are treated with non-stick and/or are equipped to be non-adhesive or so formed that it may be released from the mould body after age hardening of the resin. The same is true for the pressure block 28. The inner core may be withdrawn axially, in which case for easier release the tubular part formed by the two fabric hoses 30 and 34 may be slit to simplify the release of the inner core in regions which later do not form part of the tube shell 4. For removing the mould element 26 the two fabric hoses 32, 34 may be separated by a knife for example in the region of the base 36 of the mould element 26. For this, in the base surface 21 of the mould element 26 a longitudinal groove 38 may be provided as a guide for the knife or some other separating tool.

Figure 3:
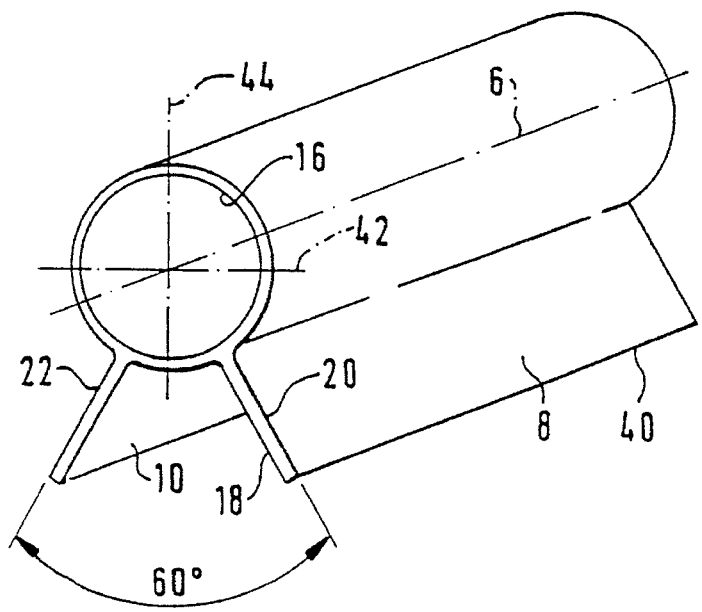
FIG. 3 shows a starting element for a connection element according to FIG. 1 manufactured with the device according to FIG. 2

Semi-finished goods which are manufactured in this way are shown in FIG. 3. The free longitudinal edges 40 of the joint plates 8 and 10 are cut to the predetermined measurements. Then the tubular part is divided longitudinally according to the desired arcuate extent in the embodiment according to FIG. 1 with a arcuate extent of 180 degrees, thus in the plane 42 which is perpendicular to the plane 4 of symmetry of the connection element. Then the connection elements are cut off from the semi-finished goods, which can be manufactured in fairly large lengths, into the lengths desired in each case.

The angle between the joint plates discs 8, 10 is selected in accordance with the respective requirements. It may also amount to 90 degrees. Even larger angles, for example of 180 degrees, are possible with diametrically opposite joint plates.

Figure 4:
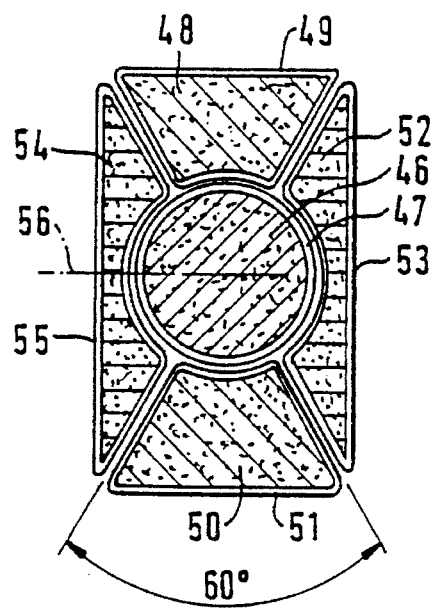
FIGS. 4 and 5 show in each case cross sections of devices for manufacturing connection elements with four joint plates.
Figure 5:
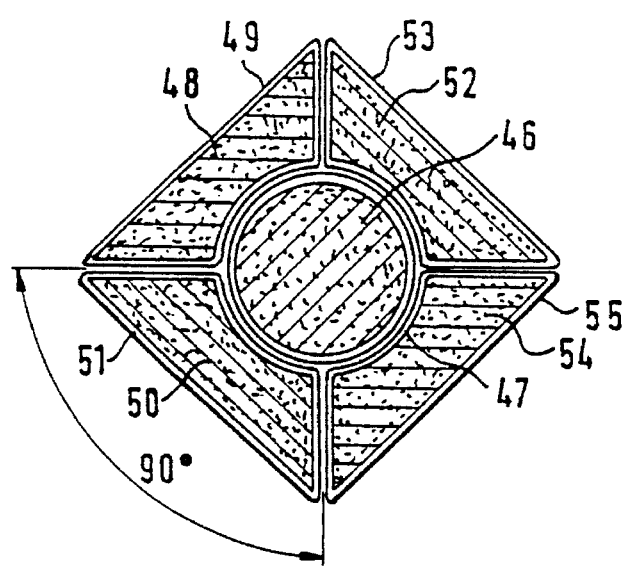
Figure 6:
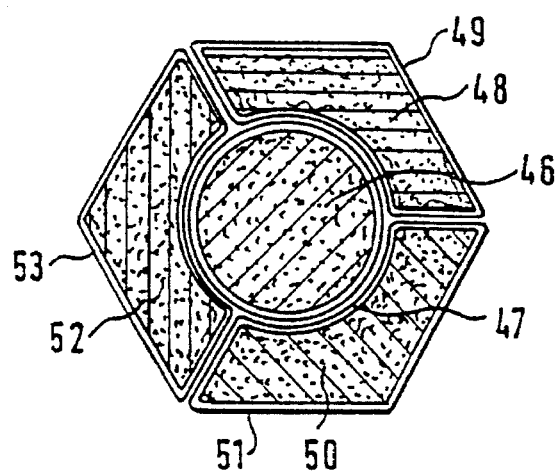
FIG. 6 shows a cross section through a device for manufacturing connection elements with three joint plates.

Other devices for manufacturing connection elements according to the invention are shown in FIGS. 4 to 6. With these connection elements in addition to the inner core there is provided a number of outer cores 48, 50, 52, 54 corresponding to the number of joint plates, for whose cross sectional shape what has been said above concerning the formation of the mold element applies.

The device according to FIG. 4 serves to manufacture connection elements, as are shown in FIG. 1, i.e. connection elements with an angle of 60 degrees between two adjacent joint plates. Thus the mould elements 48 and 50 correspond to the mould element 26 of the embodiment according to FIG. 2. The two further mould elements 52 and 54 are formed in the regions between the mould elements 48 and 50 in accordance with the outer contour of the tube shell and the joint plates. The entirety of the mould elements forms therefore the outer shape of the semi finished product which is to be manufactured with this device, from which the mould elements according to FIG. 1 are manufactured.

In order to manufacture such semi-finished product with four joint plates a fabric hose made from carbon fibres is applied in the inner core 46 in turn in the above mentioned manner. Further fabric hoses (49, 51, 53, 55) are applied to the four mould elements 48 to 54. The fabric hoses are then wetted in turn in those regions in which they form part of the double walls of the semi-finished product. Then the four mould elements 58 to 54 are pressed against the inner core 26 and pressed together and held under pressure until the resin has hardened. Then as described above the fabric hoses are split in all four outer mould elements at the base of the mould elements and the mould elements 48 to 54 are removed. The inner core is drawn out of the tubular part. The free edges of the joint plates are cut at their longitudinal edges to the predetermined size. In order to manufacture connection elements according to FIG. 1, the semi-finished product is divided in the plane of symmetry 56. In this way are generated two lengths from which the connection elements are separated off in the desired lengths.

In the embodiment according to FIGS. 5 and 6 the device is constructed in the same way as described above with reference to FIG. 4. In the embodiment according to FIG. 5 the joint plates enclose equal angles of 90 degrees. The method of manufacture corresponds to that described above with reference to FIG. 4. Here too in each case connection elements may be produced with two joint plates by separating in the plane of one of the two lines of symmetry. If connection elements with four joint plates are required, the tube walls forming the tube shell should be split at one side between two joint plates with a width such that the tube shell supporting the joint plates can be pressed against the strut surface under pressure when gluing to the strut rod.

In FIG. 6 a device for the manufacture of a connection element with three joint plates is shown and these lie at equal angles of 120 degrees to each other. Here three outer mould elements are used. The manufacture of the semi-finished product takes place in the same way here as described with reference to FIG. 4. Here too the tubular walls from which the joint plates discs radially project, is split longitudinally between two joint plates, so that the tube shell can be glued under pressure to a strut.

As can be readily seen, with the described devices according to FIGS. 4 to 6, connection elements can be manufactured with three and more nodal discs at different angles between joint plates.

With connection elements in which the tube shell as mentioned above is formed exclusively from the fabric portions 18, 20 and 22, there is no fibre fabric hose applied to the core. Basically it is also possible to operate without fabric hoses and instead to use fabric strips with fibres crossing at ±45 degrees. Combinations are also possible for the purpose of easier handling. Thus for example in the device according to FIGS. 4 and 5 the two mould elements 48 and 50 may be covered with a fibre fabric hose in the manner described above,-while the said fabric strips may be used for the fabric layers to be shaped by the mould elements 52 and 54. These fabric strips may be held on the back of the mould elements by clamping flaps at their longitudinal edges. Obviously it is also possible for all mould elements to manage without fabric hoses and to use fabric strips exclusively. This is also true if for all or individual mould elements more than one fabric layer is to be provided. If there is no fabric hose applied to the inner core, the inner surface of the tube shell is moulded directly on the inner core.

Figure 7:
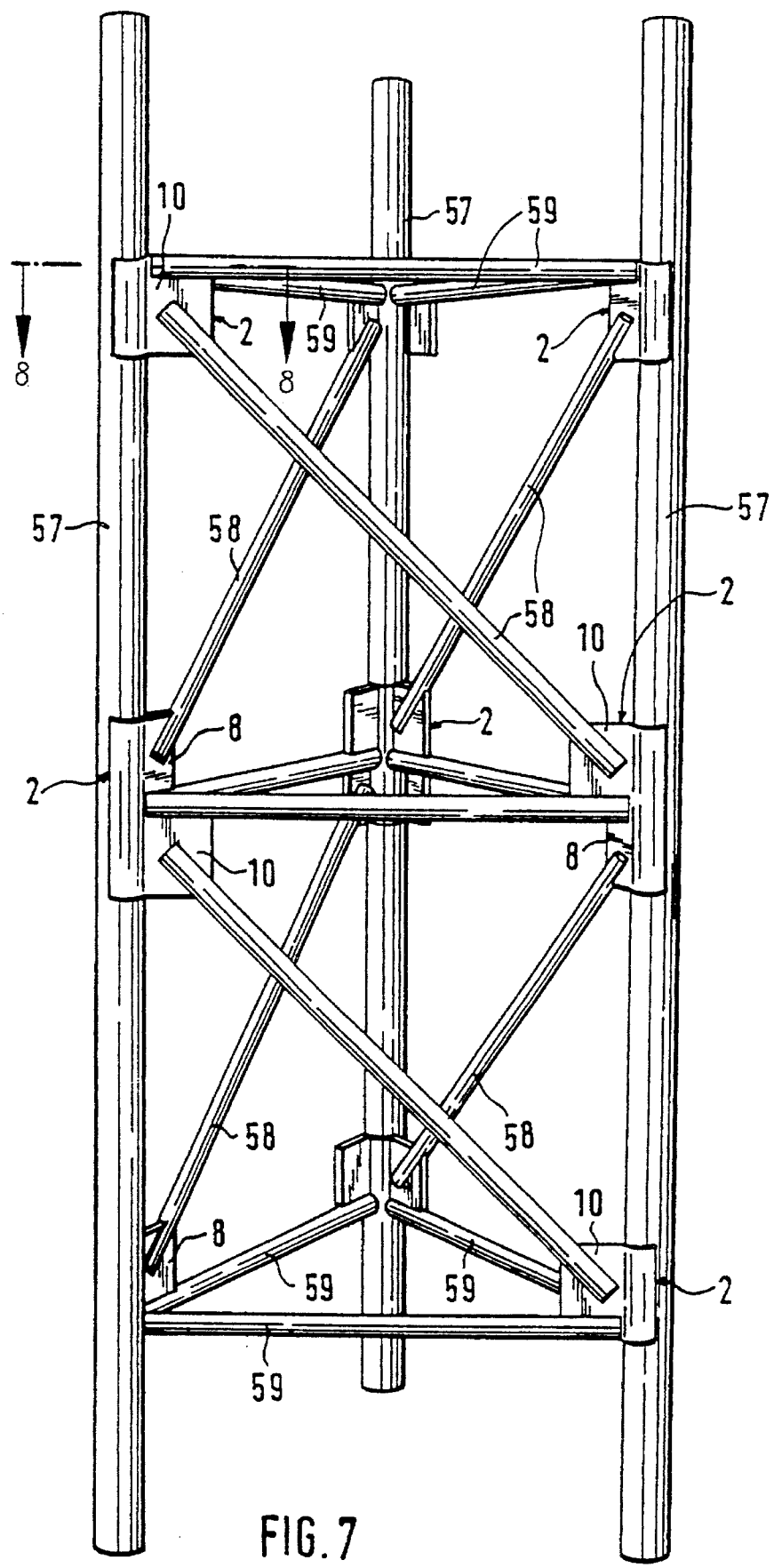
FIG. 7 shows a view of a three-dimensional framework with joint plates according to the invention.

The three-dimensional framework shown in FIG. 7 is formed with a cross section formed as an equilateral triangle and has three parallel strut rods 57. Between two adjacent strut rods are in each case diagonal rods 58 and transverse rods 59 which are attached to the strut rods by the connection elements 2 with the joint plates 10. In order to obtain the overview not all joint plates are shown. The struts 57 form in each case a framework junction with the connection elements 2 and the diagonal and transverse rods connected to their joint plates. The basic structure of such a framework with the transverse rods 59 arranged perpendicular—i.e. at an angle of 90 degrees—to the strut rods and the diagonal rods 58 which lie at an angle of for example 45 degrees to the strut rods is known. Three transverse rods 58 lie parallel to each other in the embodiment shown in FIG. 1 in each of the three framework planes. Flat frameworks have only two parallel strut rods 57 and transverse and diagonal rods lying therebetween. The strut rods 57 and the transverse and diagonal rods 59 and/or 58 are thin-walled round fibre composite rods with a compression resistant foam core, the walls of which have at least one layer made of axially parallel unidirectional elongate fibres. High resistance carbon fibres are used as the fibres.

Figure 8:
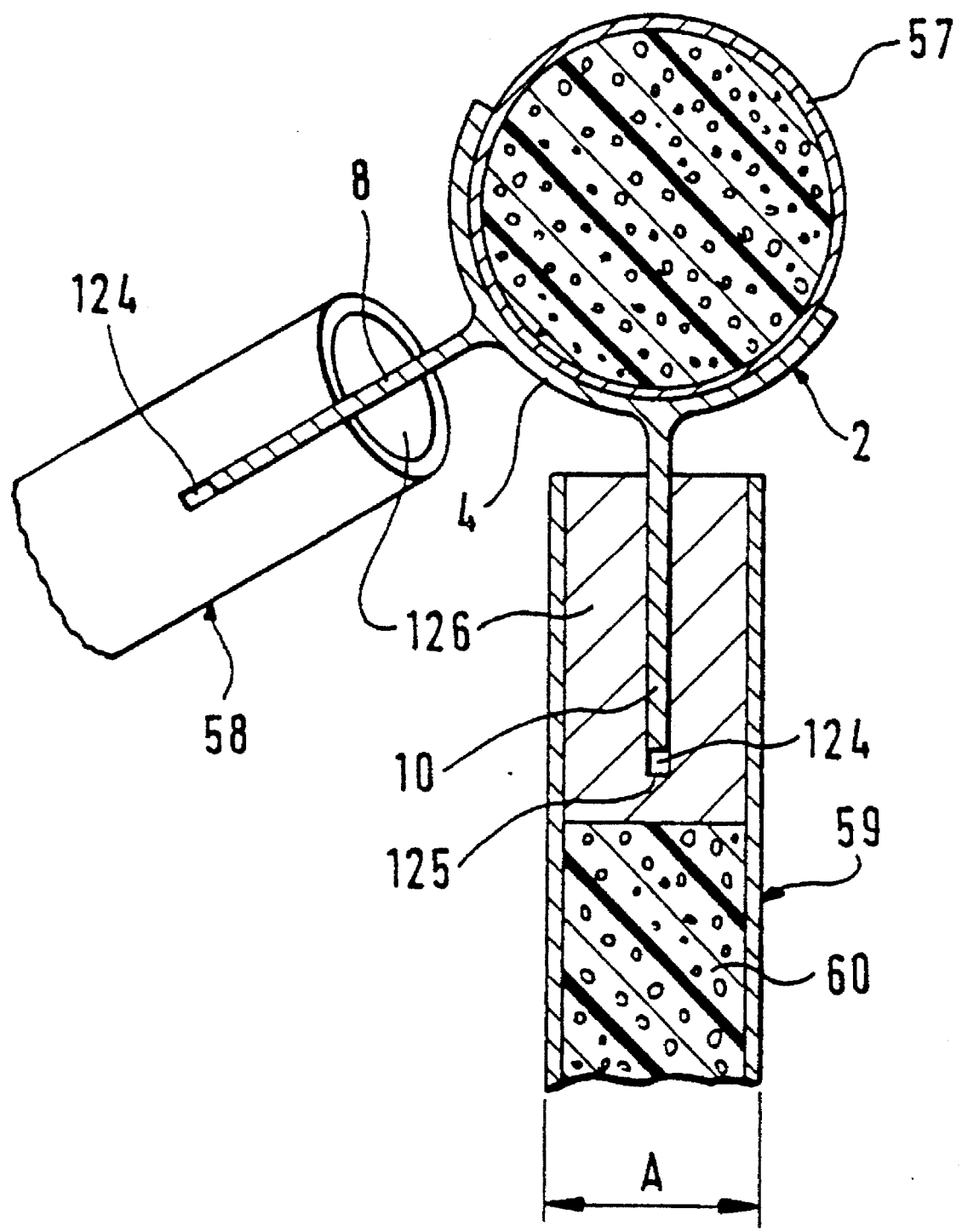
FIG. 8 shows a section along the line A-B in FIG. 7.

FIG. 8 shows in the section along the line A-B in FIG. 7 a strut rod 57 of the three-dimensional framework with triangular cross section, to which a connection element 2 is glued by its tube shell 4. The rods 58 and 59 are connected to the joint plates 8, 10.

The rods 58 and 59 are provided at their two ends with slots the width of which is slightly wider than the thickness of the joint plates 8, 10 and with which they can be pushed on to the joint plates. The connection takes place by gluing surface to surface.

The tensile and compression forces in the diagonal and transverse rods 58, 59 which have a diameter A of 10–12 mm for example with a diameter of the strut rods 57 of 20 mm, are with glue connections introduced into the joint plates 10 as shear forces. The rigidity of the foam core of the diagonal and transverse rods 58, 59 is insufficient in many cases for transmitting these shear forces. The slotted ends of these rods have to be strengthened in order to achieve the required shear strength of the glue surfaces.

For this purpose, with the embodiment according to FIG. 8 in the region of the slots 124 in the ends of the diagonal and traverse rods 58, 59, a rigid filling element 126 in each case made of a light material is provided, for example fibre-reinforced plastics, which has a higher rigidity than the foam of the foam core 8. At the rod ends the foam core 60 is cut into in the region in which the slots are cut or are removed up to under the lower end 125 of the slot 124. The cylindrical filling element 126 with an outer diameter slightly less than the inner diameter of the rod walls and an axial length greater than the depth of the slot 124 is glued into the ends of the rod. The slot 124 is glued into the ends of the rod. The slot 124 is preferably cut into the rod end after hardening the glue. Via the filling element the predominant part of the axial forces acting in the traverse and/or diagonal rods is transmitted as a shear force to the joint plate via the glue surface. Such a filling element may comprise a fibre reinforced plastic and also be formed as an injection moulded element which with larger diameters may even be provided with through openings and which may already be provided with the slot.

The other embodiments of such strengthening are shown in FIGS. 9 and 10 and FIGS. 11 and 12 on a larger scale than FIG. 8.

Figure 9:
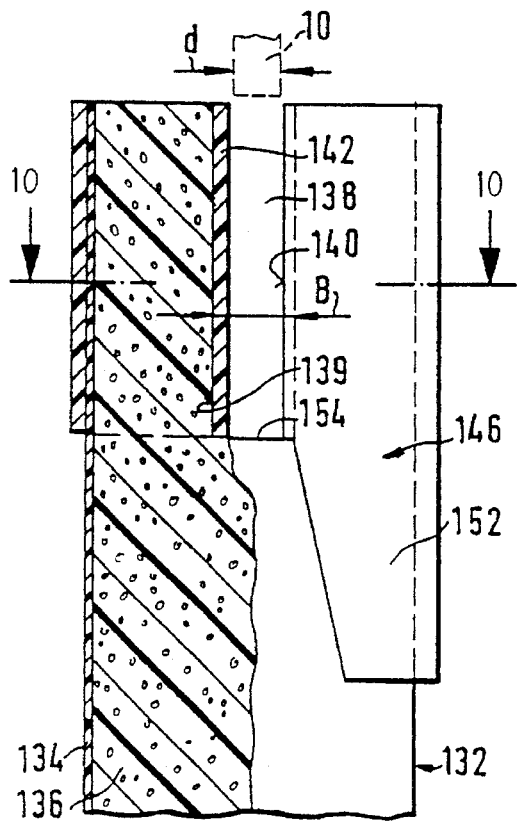
FIG. 9 shows a side view of an end of a diagonal or transverse rod with a second shape.
Figure 10:
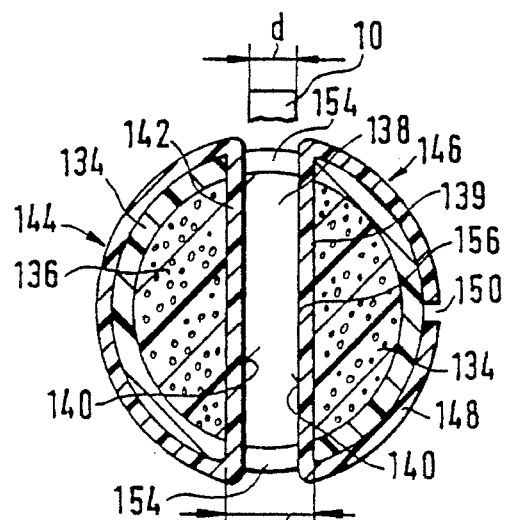
FIG. 10 shows a section along the line E-F in FIGS. 8, 9.

In the embodiment according to FIGS. 9 and 10 the rod 132 is provided at its end with a slot 138 cutting through the rod walls 134 and the foam core 136, the width B of said slot being greater than the thickness d of the joint plate 10 indicated in broken lines. The parallel walls 140 of the slot 138 are formed here in each case by a portion 142 of a composite fibre material which is part of fibre tube portions 144 which are impregnated with synthetic resin and extends in each case through the slot 138 and externally about the two circle segment-shaped portions of the rod end which are separated by the slot 138.

The two fabric tubes 144 wetted with resin may be shaped before hardening in the region of the slot 138 with the aid of a shaping plate by which the fabric tube portions 142 in the slot 138 are pressed against the flat surfaces 139 of the foam core 136.

Instead of shaping with fabric tubes wetted with resin in situ pre-fabricated shaped elements 146 may also be used as strengthening elements, as illustrated on the right in FIGS. 9 and 10. In order to manufacture these shaped elements 146 a fabric tube may be drawn on to a core the cross section of which corresponds to the cross section of the circle segment shaped portions at the end of the rod which are separated the slot 138, wetted with synthetic resin and hardened. The fabric tube is then provided in its rounded cross section part 148 with a longitudinal slot 150 preferably centrally in a longitudinal direction, as shown on the right in FIG. 5. Such a shaped element 146 may be further be so formed that the rounded walls extend to below the lower end 154 of the slots 138 with a portion 152 on the outer periphery of the rod 132, as is shown in FIG. 9. Thus a weak point of the rod in the region of the lower end 154 of the slot 138 is strengthened. Shaped elements 146 constructed in this way may be then pushed onto the rod ends and glued externally to the rod walls and preferably also to the surface 139 of the foam core 136 which borders the slot 138. The longitudinal slot 150 facilitates a definite pressing force for gluing to the outside of the rod.

Figure 11:
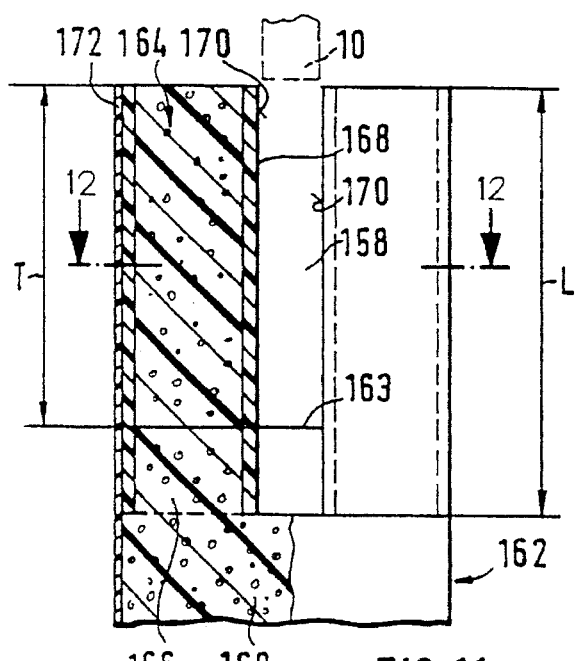
FIG. 11 shows a side view of an end of a diagonal or transverse rod in a further embodiment of a reinforcement, in which on the left the rod is shown axially in section.
Figure 12:
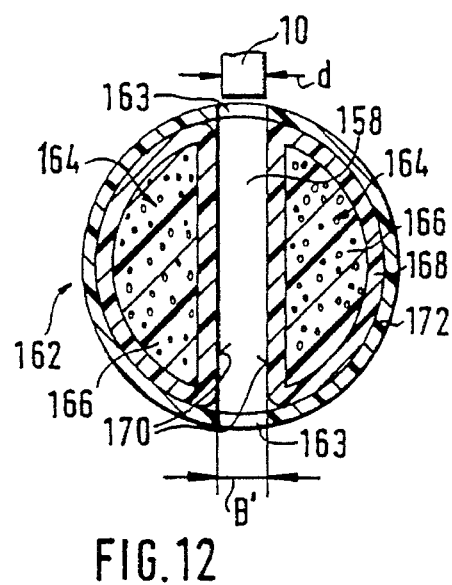
FIG. 12 shows a section along the line G-H in FIG. 11.

In the embodiment according to FIGS. 11 and 12 the slot 158 in the rod end has a width B', as with the embodiment according to FIG. 8, which width is slightly larger than the thickness d of the joint plate 10 indicated in broken lines. The foam core 160 of the rod 162 is removed to below the lower end 163 of the slot 158. Two strengthening elements 164 are inserted into the rod end and have circle segment-shaped foam core portions 166 which are covered by a fibre fabric tube 168 which is wetted with a resin. These strengthening elements 164 have a length L which is greater than the depth T of the slot 158. They extend therefore up to beyond the base 163 of the slot 158, preferably up to the bordering end of the foam core 160 of the rod.

With this embodiment too the flat surfaces 170 of the strengthening elements 164 which delimit the slot may be shaped in situ via a shaping plate which slightly oversize relative to the thickness of the joint plate 10. Thus the dimensions of the two strengthening elements 164 are preferably to be selected so that the rounded surface of the strengthening element with the fabric tube 168 is pressed against the inside of the rod walls 172 by the shaping plate. Contact pressure below the lower end 162 of the slot 158 may be achieved by providing the shaping plate with an offset corresponding to the inner diameter of the rod walls, with which the ends of the strengthening elements 164 which project under half of the lower end 162 of the slot 158 are pressed against the inside of the rod walls so that here too a definite gluing is ensured.

The embodiments according to FIGS. 11 and 12 also has the advantage that the weak point of the rod is strengthened in the region of the lower end 163 of the slot 158.

A further embodiment of fixing diagonal or transverse rods to a strut rod is shown in FIGS. 13 and 14. A connection element 2 with joint plates 10. A connecting element 2 with joint plate 10 is glued on the side of a strut rod 57. Two diagonal rods 174 are connected to the connection element 2. These rods lie at an angle of 45 degrees to the axis 176 of the strut rod 57 and are inclined at their connection ends at a corresponding angle. The rod ends are provided with a slot 178 which may have a depth so that the base 180 of the slot abuts against the joint plate 10. The tip of the joint plate may penetrate into the foam core at the base of the slot.

Two mirror-image mould shells 184, 186 are provided for fixing. These mould shells have a central flat web portion 188 and two portions 190 connected thereto which have an essentially semi circular cross section in the section along the line K, L and are so arranged and formed that they encircle the rod ends in the region of the joint plate 172. Both sides of the portions are in turn flat portions 182. The portions 180 are so shaped that when the flat portions 182,188 are placed against outer surfaces of the joint plate; they engage around the ends of the rods with the smallest possible clearance.

The connection of the diagonal rods 174 to the joint plate 10 is made by pushing the diagonal rods on to the joint plate, in which adhesive may be inserted into the slots, but does not have to be. The two mould shells are then provided with adhesive and placed on to the joint plate 182 so that the diagonal roads are held positively at the end. In the flat portions 182, 188 a flat pressure is then preferably applied while the adhesive hardens.

Definable gluing can be implemented very precisely with the described mould shells 184. The mould shells preferably consist of a very thin-walled fibre composite material with glass fibres. They are then transparent and it can be easily checked visually through the shells, whether there is a full-area application of adhesive and or a fully glued area.

In FIG. 13 an embodiment is shown on the left in which the mould shell is moulded from a rectangular blank. In this a pointed corner 192 is formed which engages over the rod over a limited end beyond the slot base 180. An embodiment of the mould shell is shown on the right in FIG. 13 which additionally reinforces the rod in the region beyond the slot base 180. Here the mould shell is provided with extensions lengthening the semicircular shell. In this embodiment the rod 174 is encircled by this extension 194 substantially over the whole periphery over a length a from the base 180 of the slot. This length a may be selected so that an optimum stiffening in this critical region is ensured beyond the slot base.

FIG. 15 shows a connection element 2 with two joint plates 10, as used in the three dimensional framework of FIG. 7. On the left the rod 174 is fixed with a mould shell to the joint plate, as illustrated on the left of FIG. 13. On the right the rod 174 is fixed with a mould shell to the joint plate as illustrated on the right of FIG. 13.

I claim:

1. A connection element for connecting a reinforcing rod to a main rod wherein the reinforcing rod lies at an angle to the axis of the main rod said connecting element comprising an arcuate body (4) having a central axis (6) and an inner surface with a radius substantially equal to an outer radius of said main rod, said arcuate body extending in its cross-section over an arc of less than 360 degrees, said connection element further comprising an integrally formed joint plate (8) projecting radially outwardly from an outer surface of said arcuate body in a plane containing the axis of said arcuate body, said joint plate (8) being formed by two layers of a fabric (18, 20) wherein fibers of the fabric layers cross at an angle of substantially ±45 degrees, said fabric layers extending from said joint plate onto said arcuate body to form said outer surface of said arcuate body.

2. The connection element of claim 1 comprising first and second joint plates having adjacent inwardly facing surfaces wherein a single fabric layer forms said inwardly facing surfaces and an outer surface portion of said arcuate body which extends between said inwardly facing surfaces of said joint plates.

3. In the connection element of claim 1, said inner surface of said arcuate body being formed by a single continuous layer of fabric having fibers which cross at an angle between ±65 degrees to ±75 degrees to said arcuate body axis.

4. A rod arrangement comprising a main rod and a reinforcing rod extending at an angle to said main rod, said main rod and said reinforcing rod having a round cross-section and a longitudinal axis, each rod respectively comprising a core of compression resistant foam material surrounded by a cylindrical tube of fiber composite material with at least one layer of fibers lying unidirectionally and parallel with said longitudinal axis of said rod, each rod further comprising a fabric hose lying over said unidirectional fibers of said tube and having fibers which cross at an angle to the rod axis, said rod arrangement further comprising a connection element for connecting said reinforcing rod to said main rod, said connection element comprising an arcuate body (4) having a central axis (6) and an inner surface with a radius substantially equal to an outer radius of said main rod, said arcuate body extending in its cross-section over an arc of less than 360 degrees, said connection element further comprising an integrally formed joint plate (8) projecting radially outwardly from an outer surface of said arcuate body in a plane containing the axis of said arcuate body, said joint plate (8) being formed by two layers of a fabric (18, 20) wherein fibers of the fabric layers cross at an angle of substantially ±45 degrees, said fabric layers extending from said joint plate onto said arcuate body to form said outer surface of said arcuate body, said inner surface of said connection element being secured with an adhesive to the outer surface of said main rod, said reinforcing rod having a compression resistant reinforcement inserted into one end thereof and further having an axially symmetrical slit formed in said one end thereof to form a slotted end, said slit being received over said joint plate with said reinforcing rod being arranged at an angle to the axis of said main rod, wherein said slotted end of said reinforcing rod is secured to said joint plate with an adhesive.

5. In the rod arrangement of claim 4, said inner surface of said arcuate body being formed by a single continuous layer of fabric having fibers which cross at an angle between ±65 degrees to ±75 degrees to said arcuate body axis.

6. In the rod arrangement of claim 4, said reinforcing rod having said core removed from said one end thereof to a point beyond said slit to form a hollow end cavity, said compression resistant reinforcement comprising a reinforcement body which is inserted into said hollow end cavity, said reinforcement body abutting against an inner surface of said end cavity and being secured thereto with an adhesive.

7. In the rod arrangement of claim 6, said reinforcement body comprising a molded body formed from a composite material.

8. In the rod arrangement of claim 6, said reinforcement body comprising a semi-circular foam core surrounded by a carbon fiber fabric hose in a resin matrix, said reinforcement body being secured to an inner surface of said end cavity, said reinforcement body extending beyond a lower end of said slit.

9. In the rod arrangement of claims 6, said reinforcing rod further including a pair of semi-circular sleeves comprising fabric hoses imbedded in a resin matrix, each of said sleeves being received over a respective side portion of said slotted end of said reinforcing rod wherein flat walls of said sleeves form the walls of said slot.

10. In the rod arrangement of claim 9, said sleeves including rounded outer walls which extend downwardly beyond a lower end of said flat walls.

11. In the rod arrangement of claim 9, said sleeves including rounded outer walls, said rounded outer walls including a longitudinal slot therein.

12. The rod arrangement of claim 4 further comprising mold shells for attachment to said joint plate, said mold shells having flat sections which are formed by facing walls, said facing walls including facing enlargements which cooperate to form a cavity having an internal contour matching an external contour of said reinforcing rod, said slotted end of said reinforcing rod being received into said cavity and over said joint plate.

13. In the rod arrangement of claim 12, said slotted end of said reinforcing rod having an inclined end face which lies substantially parallel to the axis of said main rod when said reinforcing rod is received with the joint plate.

\* \* \* \* \*